(12) United States Patent
Wijenberg et al.

(10) Patent No.: US 6,846,401 B2
(45) Date of Patent: Jan. 25, 2005

(54) METHOD OF PLATING AND PRETREATING ALUMINIUM WORKPIECES

(75) Inventors: Jacques Hubert Olga Joseph Wijenberg, Amsterdam (NL); Joop Nicolaas Mooij, Castricum (NL)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 107 days.

(21) Appl. No.: 10/125,583

(22) Filed: Apr. 19, 2002

(65) Prior Publication Data

US 2003/0042146 A1 Mar. 6, 2003

(30) Foreign Application Priority Data

Apr. 20, 2001 (DE) .......................................... 012 01 444

(51) Int. Cl.[7] .......................... C25D 11/16; C25D 5/10; C25D 5/12; C23D 28/02; B05D 3/00
(52) U.S. Cl. ..................... 205/213; 205/176; 205/177; 205/181; 205/182; 205/184; 205/185; 205/170; 427/299; 427/436
(58) Field of Search ............................... 427/299, 435, 427/436; 205/213, 176, 177, 181, 182, 184, 185, 170, 214; 428/652, 654

(56) References Cited

U.S. PATENT DOCUMENTS

| | | |
|---|---|---|
| 2,745,799 A | 5/1956 | Patrie |
| 2,821,014 A | 1/1958 | Miller |
| 2,821,505 A | 1/1958 | Beach |
| 3,482,305 A | 12/1969 | Dockus et al. |
| 3,489,657 A | 1/1970 | Brenan et al. |
| 3,597,658 A | 8/1971 | Rivera |
| 3,692,583 A | 9/1972 | Mucenieks et al. ............ 134/3 |
| 3,862,018 A | 1/1975 | Mentone ...................... 204/32 |
| 3,881,999 A | 5/1975 | Toth et al. ..................... 204/33 |
| 3,896,009 A | 7/1975 | Kobayashi et al. ............ 204/26 |
| 3,963,454 A | 6/1976 | Singleton, Jr. |
| 3,970,237 A | 7/1976 | Dockus |
| 4,028,200 A | 6/1977 | Dockus |
| 4,097,342 A | 6/1978 | Cooke et al. .................. 204/28 |
| 4,126,522 A | 11/1978 | Edlund ........................ 204/28 |
| 4,157,154 A | 6/1979 | Scott et al. |
| 4,164,454 A | 8/1979 | Schober |
| 4,177,325 A | 12/1979 | Roberts et al. ............. 428/629 |
| 4,346,128 A | 8/1982 | Loch ........................... 427/406 |
| 4,388,159 A | 6/1983 | Dockus et al. ................ 204/33 |
| 4,397,721 A | 8/1983 | Exalto et al. ................ 204/144 |
| 4,602,731 A | 7/1986 | Dockus |
| 4,721,653 A | 1/1988 | Oda et al. |
| 4,741,811 A | 5/1988 | Lefebvre et al. |
| 5,069,980 A | 12/1991 | Namba et al. |
| 5,234,574 A * | 8/1993 | Tsuji et al. .................. 205/213 |
| 5,245,847 A | 9/1993 | Bando et al. |
| 5,246,565 A | 9/1993 | Mignardot .................. 205/181 |
| 5,422,191 A | 6/1995 | Childree |
| 5,466,360 A | 11/1995 | Ehrsam et al. |
| 5,601,695 A | 2/1997 | Muranushi |
| 5,643,434 A | 7/1997 | Benmalek et al. ........... 205/109 |
| 5,961,853 A | 10/1999 | Thornton |
| 5,997,721 A | 12/1999 | Limbach et al. ............. 205/680 |
| 6,060,174 A | 5/2000 | Sabol et al. ................. 428/610 |
| 6,129,262 A | 10/2000 | Cooper et al. |
| 6,165,630 A | 12/2000 | Gehlhaar et al. ........... 428/658 |
| 6,379,818 B1 | 4/2002 | Mooij et al. |
| 6,383,661 B2 | 5/2002 | Wittebrood et al. |
| 6,391,476 B2 | 5/2002 | Wittebrood et al. |
| 6,503,640 B2 | 1/2003 | Wittebrood et al. |
| 6,568,584 B2 | 5/2003 | Wittebrood et al. |

FOREIGN PATENT DOCUMENTS

| | | |
|---|---|---|
| CH | 655134 | 12/1983 |
| DE | 3821073 | 1/1989 |
| EP | 0227261 | 7/1987 |
| EP | 795048 | 6/1996 |
| FR | 2354171 | 1/1978 |
| FR | 2617868 | 1/1989 |
| GB | 1176688 | 1/1970 |
| GB | 2000525 | 1/1979 |
| JP | 54013430 | 1/1979 |
| JP | 5106059 | 4/1993 |
| JP | 11097298 | 4/1999 |
| WO | 9743467 | 11/1997 |
| WO | 0071781 | 11/2000 |
| WO | 0071784 | 11/2000 |
| WO | 0168312 | 9/2001 |
| WO | 0188226 | 11/2001 |
| WO | 0238326 | 5/2002 |
| WO | 02060639 | 8/2002 |
| WO | 03043777 | 5/2003 |
| WO | 03045618 | 6/2003 |
| WO | 03045619 | 6/2003 |

OTHER PUBLICATIONS

US Pat. App. Pub. No. US 2002/0175205 (Ser. No. 10/060,117), filed Jan. 31, 2000, Wittebrood et al.

US Pat. App. Pub. No. US 2003/0098338 (Ser. No. 09/990,507), filed Nov. 21, 2001, Dockus et al.

US Pat. App. Pub. No. US 2002/0088717 (Ser. No. 09/984,968), filed Oct. 31, 2001, Wittebrood et al.

US Pat. App. Pub. No. US 2003/0064242 (Ser. No. 10/230,429), filed Aug. 29, 2002, Wittebrood et al.

US Pat. App. Pub. No. US 2003/0091856 (Ser. No. 10/042,752), filed Dec. 20, 2002, Wittebrood.

(List continued on next page.)

*Primary Examiner*—Edna Wong
(74) *Attorney, Agent, or Firm*—Stevens, Davis, Miller & Mosher, LLP

(57) ABSTRACT

A method for applying a metal layer onto at least one surface of an aluminium or aluminium alloy workpiece, including the steps of pretreating the surface and applying the metal layer by plating, wherein the pretreating step includes a non-electrolytic treatment by immersion of the workpiece in a single acidic solution, preferably a sulphuric acid solution, having a temperature of at most 100° C. A brazed assembly comprising at least one component of an aluminium workpiece made by this method is also disclosed.

23 Claims, No Drawings

OTHER PUBLICATIONS

US Pat. App. Pub. No. US 2002/0175205 (Ser. No. 10/060,117), filed Jan. 31, 2002, Wittebrood et al.

ASTM G–85 (1990).

Bureau of Mines Technology, "Aluminium Soft–Soldering", 2301 N.T.I.S. Tech Notes (manufacturing), XP–002119816, 1985, Jan. No. 1G, Springfield, VA, pp. 12–13.

Wernick and Pinner, "The Surface Treatment and Finishing of Aluminium and its Alloys", $5^{th}$ edition, vol. 1, pp. 181–182 and pp. 191–203 (1988), no month.

Wernick and Pinner, "The Surface Treatment and Finishing of Aluminium and its Alloys", $5^{th}$ edition, vol. 2, pp. 1006–1022 and pp. 1023–1071 (Ch. 14–15)(Nov. 1988).

SAE Paper No. 880446 by B.E. Cheadle and K.F. Dockus, "Inert Atmosphere Fluxless Brazing of Aluminum Heat Exchangers", ICE, Detroit, Michigan, pp. 1–11 (Feb. 29–Mar. 4, 1988).

Adrianus Jacobus Wittebrood, Jacques Hubert Olga Joseph Wijenberg, Joop Nicolaas Mooij, "Nickel–Plated Aluminum Brazing Sheet" Research Disclosure, No. 439, pp. 1946–1947 (Nov. 2000).

SAE Paper No. P–263 by Kent Schölin and Bo Mannerskog, "Corrosion Resistant Aluminium Radiator Materials for Vacuum and Controlled Atmosphere Brazing" pp. 75–82, 1993 Vehicle Thermal Management Systems Conference Proceedings, no month.

Greef, N. et al, "The Hydrogen Evolution Reaction,", Instrumental Methods in Electrochemistry, pp. 233–236 (1990), no month.

U.S. Appl. No. 10/621,601, Wijenberg et al., filed Jul. 18, 2003 (unpublished).

U.S. Appl. No. 10/622,122, Wijenberg et al., filed Jul. 18, 2003 (unpublished).

US Published Pat. application No. 2003/0189082, (Ser. No. 10/300,837), Dockus et al., filed Nov. 21, 2002, published Oct. 9, 2003.

US Published patent application No. 2003/0155409, (Ser. No. 10/300,836), Dockus et al., filed Nov. 21, 2002, published Aug. 21, 2003.

U.S. Appl. No. 10/732,448, Wittebrood et al., filed Dec. 11, 2003 (unpublished).

U.S. Appl. No. 10/732,405, Wittebrood et al., filed Dec. 11, 2003 (unpublished).

* cited by examiner

METHOD OF PLATING AND PRETREATING ALUMINIUM WORKPIECES

FIELD OF THE INVENTION

The invention relates to a method for applying a metal layer onto at least one surface of an aluminium or aluminium alloy workpiece, comprising the steps of pretreating the surface and applying the metal layer by plating on the workpiece.

BACKGROUND OF THE INVENTION

In U.S. Pat. No. 4,388,159, K. F. Dockus et al. disclose a complex surface preparation treatment of the surfaces of aluminium and aluminium alloy articles, in particular aluminium-silicon alloys prior to plating a nickel or nickel-lead layer for brazing, the treatment comprising the steps of abrading the surface with a low-density abrasive product comprising a plurality of flexible, tough fibrous members intertwined and bonded together and having abrasive granules randomly distributed throughout and bonded thereto, in the presence of an $C_1$–$C_4$ alcohol, preferably isopronanol.

In U.S. Pat. No. 4,097,342, W. E. Cooke et al. disclose an electrolytic cleaning treatment which involves subjecting aluminium strip to direct current ("d.c.") anodising for a few seconds at high temperature, preferably more than 80° C., and current density in a concentrated strong mineral acid electrolyte.

SUMMARY OF THE INVENTION

It is an object of the invention to provide a method of applying a metal layer onto at least one surface of an aluminium or aluminium alloy workpiece, comprising the steps of pretreating the surface and applying the metal layer by plating, wherein the method results in an improved adhesion of the subsequent applied thin intermediate metal layer, ideally a thin zinc or tin layer of not more than 1 micron.

In one aspect of the invention there is provided a method for applying a metal layer onto at least one surface of an aluminium or aluminium alloy workpiece, comprising the steps of pretreating the surface and applying the metal layer by plating, characterised in that the pretreating step comprises a non-electrolytic treatment by immersion of the workpiece in a single acidic solution, preferably a sulphuric acid solution, having a temperature of at most 100° C., typically less than 100° C. The immersion time of the workpiece in the single acidic solution should be in the range of up to 20 sec., preferably in the range of 0.1 to 10 sec., and more preferably in the range of 0.2 to 6 sec.

This achieves the effect that a single pretreatment step may be applied prior to the application of an intermediate metal layer. The method of pretreatment may be applied over a wide temperature range up to 100° C. At temperatures below 30° C. the effect of the acid non-electrolytic treatment bath is too low for use in an industrial continuous process and requires even cooling equipment. A preferred upper-limit of the temperature is 70° C. At higher temperature the cleaning effect is very high, but the bath needs to be heated permanently which involves a significant capital investment. Furthermore, it has been found that at high temperature significant hydrogen gas evolution may occur at the aluminium workpiece surface. This results in significant amounts of aluminium being dissolved into the bath, thereby increasing the Al-ion concentration in such a bath. High concentration of Al-ions in the acid non-electrolytic treatment bath results in more difficult to handle waste stream of such a process. A more preferred temperature for the non-electrolytic treatment bath is in the range of 40 to 60° C. In this preferred temperature range a sufficient cleaning effect occurs while allowing the method to be applied on an industrial scale coil operation, and further there is no need to cool the bath to compensate for the heat generation during the immersion operation. And furthermore, in this preferred temperature range essentially no gas evolution occurs at the surface of the workpiece, resulting in a significantly lower amount of undesirable Al-ion in the bath.

It should be mentioned here that U.S. Pat. No. 4,126,522, Edlund discloses a method for plating aluminium wire with a firm layer of nickel by passing the wire through a pickling bath of an aqueous solution of phosphoric and hydrochloric acids. The use of two acids in one bath makes the process much more complex and environmentally unfriendly, whereas in the method according to our invention very good relates are achieved using a single acid bath during the pretreating step.

DETAILED DESCRIPTION OF THE PREFERRED EMBODIMENTS

In an embodiment of the invention there is provided a method for applying a metal layer onto at least one surface of an aluminium or aluminium alloy workpiece. The method includes the steps of pretreating the surface and applying the metal layer by plating, wherein the step of pretreating comprises the sequential steps of (a) non-electrolytic treatment by immersion of the workpiece in a single sulphuric acid or a single phosphoric acid solution, and (b) etching the workpiece using alternating current ("a.c.") voltage in an acidic electrolyte capable of dissolving aluminium oxide and maintained at a temperature in the range of 30° C. to less than 100° C., and preferably 60 to 100° C., under conditions such that on the surface of the workpiece no further oxide film is formed. The additional step of etching may be used if the surface of the aluminium workpiece needs an additional treatment to clean this surface. The etching should preferably be carried out above the transition temperature of the aluminium alloy used, which transition temperature is the temperature at which a.c. anodising changes to a.c. cleaning. The formation or growth of an even thicker oxide-layer on the surface than already present on the workpiece is to be avoided for obtaining a good adhesion of the thin intermediate metal layer. It is thought likely that a thin oxide film on the workpiece will always be present. Preferably the residual oxide film is less than 10 nm thick.

Very good results, including effective bonding of the applied thin intermediate layer of zinc or tin or alloys thereof may be obtained with etching process parameters comprising one or more of:

(a) alternating current, preferably with a frequency in the range of 10–1000 Hz, more preferably 40–80 Hz;

(b) current density of 1–100 $A/dm^2$, and preferably 1–25 $A/dm^2$; relatively low current densities are preferred to avoid the farther formation of a layer of oxide layer on the outer surface of the workpiece during etching;

(c) bath temperature 30–100° C., for example at least 30 to less than 100° C., preferably 60–100° C.;

(d) treatment time 0.1–30 sec., and preferably 1–10 sec.;

(e) bath molarity 0.1–5 M, preferably 0.1–2 M.

A further advantage is that these process parameters lend themselves to application in a coil operation.

On an industrial scale practice of pretreating, the two subsequent processing steps of immersion treatment and etching may be combined in one and the same solution tank, resulting in a simplified pretreating step using only one single acid solution at one essentially constant temperature both for immersion and etching.

It should be mentioned here that in U.S. Pat. No. 5,997,721, P. K. F. Limbach et al. disclose a general electrolytic cleaning treatment of an aluminium workpiece, preferably an aluminium sheet, which involves subjecting the aluminium workpiece to alternating current ("a.c.") anodising in an acidic electrolyte at a temperature of at least 85° C. The anodising step should not lead to the deliberate formation of an oxide film, but the objective is to avoid the formation of an aluminium oxide layer. The residual oxide film has preferably a thickness of less than 2.5 nanometer. It is believed that the disclosed method not only results in cleaning of the workpiece, but it simultaneously also results in an etching and a desmutting of the workpiece. According to the examples this cleaning process finds particular application in cleaning lithographic sheet involving Aluminium Association (AA) 1050A alloys, and automotive body sheet involving AA6009, AA6111 and AA5754 alloys. The subsequent application of a metallic layer or coating following the cleaning step has not been disclosed.

It should be mentioned here that in WO-97/43467, H. Gehlhaar et al. disclose a method for applying a zinc layer onto an AA3xxx-series aluminium alloy roofing sheet by means of electrolytic galvanising using a direct current having a current density of from 10 to 100 A/dm$^2$, and an electrolyte composition comprising zinc sulphate having an amount of zinc from 30 to 200 g/l and an electrolyte pH of less than 4. In galvanising a relatively thick zinc layer is immediately applied on the aluminium surface without the use of intermediate layers. The method involves a pretreating step comprising electrochemical graining in a solution having a pH less than 3 and in which an alternating current is applied. The electrochemical graining may be followed by anodising the surface. In all the examples the surfaces had been firstly degreased with a direct current of approximately 10 A/dm$^2$.

In another embodiment of the invention there is provided a method comprising the sequential steps of (a) non-electrolytic treatment by immersion of the workpiece in a sulphuric acid or phosphoric acid solution, and (b) etching the workpiece using a pulse-current voltage in an acidic electrolyte capable of dissolving aluminium oxide and maintained at a temperature in the range of 30° C. to 100° C., e.g., at least 30° C. to less than 100° C., and preferably at least 50° C., under conditions such that on the surface of the workpiece essentially no further oxide film is being formed. The additional step of etching may be used if the surface of the aluminium workpiece needs an additional treatment to clean this surface. The etching should be preferably be carried out above the transition temperature of the aluminium alloy used, which transition temperature is the temperature at which pulse current anodising changes to pulse current cleaning. The formation of a thicker oxide-layer on the surface should be avoided in order to obtain a good adhesion of the thin intermediate metal layer.

The pulse-current technique is a recognised method in the industry. The method consists in the turning on and off continuously in succession of the current applied to the aluminium workpiece. Very good results, including effective bonding of the applied thin intermediate layer of zinc or tin may be obtained with etching process parameters comprising one or more of the same parameters as for the alternating current techniques set out above except of course for the use of the alternating current. A pulse-current technique may be preferred over an alternating-current technique since it allows for the independent control of both the positive and negative pulse, resulting in that the etching effect by dissolving oxides from the surface can be controlled over a much wider range and by that also the morphology of the surface.

On an industrial scale practice of pretreating, the two subsequent processing steps of immersion treatment and etching may be combined in one and the same solution tank, resulting in a simplified pretreating step using only one single acid solution at one essentially constant temperature both for immersion and etching.

The acidic electrolyte for etching preferably contains sulphuric acid, but may also contain phosphoric acid. The acid concentration is preferably in the range 5 to 35% by weight, and more preferably in the range of 15 to 30 wt. %. Aluminium content of the electrolyte should preferably be kept below 10 g/l (of Al ion) in phosphoric acid electrolytes and below 20 g/l in sulphuric acid, since higher levels may cause a significant decrease in activity.

In a preferred embodiment the workpiece is elongated aluminium alloy stock, such as sheet or strip, wire or rod.

The term aluminium is herein used to denote pure aluminium metal and alloys containing a major proportion of aluminium. It has been found that the method according to the invention is particularly suitable for an aluminium workpiece wherein at least the outersurface of the workpiece is an Aluminium Association AA3xxx-, such as AA3003 and AA3004, AA4xxx-, or AA6xxx-series aluminium alloy. A typical example of a workpiece having an AA4xxx-series aluminium alloy as its outersurface is formed by a brazing sheet product. Brazing sheet is formed by a core sheet, for example of aluminium or aluminium alloy, having on at least one side thereof a brazeable aluminium alloy, the brazeable aluminium alloy typically being an AA4xxx-series alloy having Si in the range of 2 to 18 weight %, and preferably in the range of 7 to 14 weight %.

In another aspect of the invention there is provided a method of plating an aluminium or aluminium alloy workpiece, preferably being an aluminium brazing sheet product, comprising the sequential steps of pretreating the workpieces as set out above in any of the embodiments, the method further comprises the sequential step of plating, preferably electroplating, a metal layer or coating. In a preferred embodiment the metal is selected from the group consisting of Ni, Ni-alloys, e,g, Ni—Pb alloy, Ni—Bi alloy or Ni—Sn alloy, copper, and copper alloy. Preferably such a layer is essentially lead-free from an environmental point of view.

Preferably on the workpiece, in particular if it involves a brazing sheet product, the electroplated layer comprising nickel or nickel-bismuth alloy or nickel-lead alloy has a thickness in the range of 0.03 to 2.0 $\mu$m, preferably up to 1.0 $\mu$m, and more preferably in the range of 0.05 to 0.5 $\mu$m. A coating thickness of more than 2.0 $\mu$m requires a prolonged treatment time for plating, and may result in wrinkling of the molten filler material during a subsequent brazing operation. A preferred minimum thickness for this Ni or Ni-alloy comprising containing layer is 0.2 $\mu$m.

In an embodiment of the plating method of the invention the layer comprising nickel-bismuth is deposited by plating both nickel and bismuth using an aqueous bath having:

a pH in the range of 2.5 to 10, and comprising a nickel-ion concentration in a range of 10 to 100 g/l, and preferably in a range of 20 to 70 g/l, a bismuth-ion concentration in the range of 0.01 to 10 g/l, and preferably in the range of 0.02 to 5 g/l, a citrate-ion concentration in the range of 40 to 150 g/l, and preferably in the range of 80 to 110 g/l, a gluconate-ion concentration in the range of 2 to 80 g/l, and preferably in the range of 4 to 50 g/l, a chloride- or fluoride-ion concentration in the range of 1 to 50 g/l, and preferably in the range of 1 to 30 g/l.

This aqueous plating bath demonstrated to be operational in a very wide pH range, and can be used on industrial scale coil plating lines using a high current density, which in turn allows for fairly high line speeds. Further advantages of this plating bath are that it can be composed using standard and readily available chemicals, and bismuth can easily be replenished to the plating bath from a bismuth concentrate or otherwise.

Baths using the following salts have proved particularly effective, in grams per liter:

Nickel sulphate in a range of 45 to 450 g/l, and preferably 90 to 315 g/l,

Chloride-ion concentration in a range of 1 to 50 g/l, and preferably 1 to 30 g/l, Sodium citrate in a range of 55 to 180 g/l, and preferably 110 to 150 g/l, Sodium gluconate in range of 2 to 90 g/l, and preferably 5 to 55 g/l, Ammonium sulphate in a range up to 270 g/l, Bismuth oxide in a range of 0.02 to 22 g/l, and preferably 0.05 to 11 g/l, or Bismuth carbonate in a range of 0.03 to 29 g/l, and preferably 0.06 to 14 g/l.

The addition of an ion from the group consisting of chloride and fluoride is required for inducing anode corrosion. A suitable source of chloride-ion concentration can be done by the addition of nickel chloride ($NiCl_2.6H_2O$) in a range of up to 415 g/l, and preferably in a range up to 250 g/l.

($H^+$) or ($OH^-$) can be added to regulate the pH in a range of 2.5 to 10. The use of ammonium hydroxide should preferably be avoided in view of the generation of ammonia fumes.

Optionally for reducing stress in the deposit layer comprising the Ni and Bi an ammonium-ion concentration in a range up to 40 g/l, and preferably in a range of 1 to 25 g/l, or a triethanolamine-ion concentration in a range of up to 40 g/l, or combinations thereof, or other equivalent components may be added to the aqueous bath. Any soluble ammonium salt can be used as a source of $NH_4^+$.

The plating bath used in the method according to the invention can operate in a wide pH range of 2.5 to 10, and preferably in the range of 4 to 8, without affecting the properties of the bath and without dissolving the thin intermediate zinc or tin layer.

The method according to the invention is preferably employed using a plating bath having a temperature in the range of 30 to 70° C., and more preferably in the range of 40 to 65° C. In this temperature range the ion-mobility increases and there is no need to cool the plating bath to compensate for the heat generation during plating.

In an embodiment of the plating methods according to the invention, the aluminium or aluminium alloy workpiece is covered with an intermediate bonding layer having a thickness of not more than 1 μm, preferably of not more than 0.35 μm and typically in the range of 0.03 to 0.35 μm, and comprising tin or zinc or alloys thereof, being applied between the optional process step (b) comprising etching the workpiece and the process step (c) electroplating a metal layer, which metal layer is preferably selected from the group consisting of Ni, Ni—Bi alloy, Ni—Sn alloy, Ni—Pb alloy, copper, and copper alloy. Suitable methods of applying such an intermediate bonding layer of tin or zinc are by means of direct or immersion plating.

In the embodiment where the surface is being pretreated by the non-electrolytic immersion in a single acidic solution followed by the application of the thin zinc or tin intermediate bonding layer, the whole pretreatment (both cleaning by immersion and zinc or tin deposition) may be carried in an industrial scale pretreatment line in less than 10 sec., and where necessary even less than 5 sec. can be adequate, at moderate line speeds. Such a simple process using short pretreatment times and single acid baths prior to the further application of a metal layer is considered to be a significant improvement over the known pretreating methods known in the art.

It will be understood that in the methods set out above the aluminium alloy workpiece may be washed with water, either by immersion or spraying, in the course of transfer from one treatment bath to the next.

In a further aspect of the invention there is provided a brazed assembly comprising at least an aluminium workpiece, preferably an aluminium brazing sheet product, manufactured in accordance with the method of the invention as set out by the present specification. Preferably the aluminium brazing sheet comprises a core sheet, on at least one side clad with an AlSi brazing alloy, the brazing alloy has a thin intermediate bonding layer of zinc or tin thereon, and the intermediate layer has a layer of Ni or Ni-alloy, e.g. Ni—Bi alloy or Ni—Pb alloy or Ni—Sn alloy, thereon. Such brazing sheet products may be applied successfully in a Controlled Atmosphere Brazing ("CAB") brazing process.

The following non-limiting examples illustrate the invention.

EXAMPLE 1

On a laboratory scale of testing aluminium brazing sheets manufactured from an AA3003 core alloy clad on both sides with an AA4045 clad alloy, and having a total thickness of 0.5 mm and a clad layer thickness of 50 microns each, were differently treated using only the following sequential process steps, see also Table 1:

optional immersion in a single sulphuric acid solution of 20 wt. % $H_2SO_4$ having different temperatures (20° C., 50° C., or 95° C.) for different immersion times (2 or 5 sec.), followed by rinsing;

optional etching using an alternating current at a frequency of 50 Hz using different current densities (5 or 10 A/dm$^2$) for 60 sec. in a 20 wt. % sulphuric acid solution at 50° C., and rinsing;

applying a thin zinc layer by means of a zincate treatment using a zincate solution of 250 ml/l of ChemTec 19023 (a commercial available zincate bath) having different temperatures (20° C., 30° C., or 40° C.) for different treatment times (5, 10, 20 or 60 sec.), and rinsing.

electroplating a Ni—Bi alloy layer. The nickel plating bath used has the composition of Table 2 and has a pH of 5.5. The Bi-ion concentration has been added to the plating bath using a Bi-ion concentrate of 160 g/l sodium hydroxide, 300 g/l sodium gluconate and 110 g/l bismuth oxide. The electroplating of a Ni—Bi alloy layer was performed at 57° C. using a current density of 6 A/dm$^2$ and a plating time of 25 sec.

In Table 1 "n.a." stands for not-applied, meaning that the relevant processing step has not been used.

Following the zincate treatment and Ni—Bi alloy plating all 11 samples have been tested for adhesion of the Ni—Bi alloy layer using the Erichsen dome test, and the T-bend test. An overall value assessment is then given to the adhesion where: (−)=poor, (±)=fair, and (+)=good. The results are shown in Table 1 also.

From the results in Table 1 it can be seen that for comparative samples 1 and 2 the adhesion of the Ni—Bi layer is poor when the samples are not pretreated. From the comparison of samples 2 and 3 it can be seen that the adhesion of the Ni—Bi alloy layer is improved when pretreated using immersion in the single acid solution. Samples 3 to 6 have been immersed in the single acid solution at different temperatures. During carrying out the experiments it has been observed that when cleaning at 20° C. and 50° C. nearly no hydrogen gas evolution occurred at the surface of the samples, whereas at immersion at a temperature of 95° C. severe hydrogen gas evolution occurred. So far, no effect of the gas evolution has been found on the adhesion of the Ni—Bi alloy layer. However, hydrogen gas evolution is a known indication that not only the aluminium oxide is dissolving, but also that the metallic aluminium is being attacked. The later being an undesirable effect. From the samples 4 to 6 it has been found that the zincate treatment time can be shortened by operating the zincate process at an increased temperature, preferably up to about 40° C. When using the present zincate solution, the immersion temperature should not exceed 45° C. in order to avoid decomposition of organic compounds present in the solution. From the comparison of samples 2 and 7 it can be seen that when the single acid immersion is followed by etching using a.c. current of the sample at a temperature as low as 50° C., that the adhesion of the Ni—Bi layer is surprisingly significantly improved when the sample prior to etching is being immersed in the single acid solution at a temperature of room temperature. Further improvements with respect to the adhesion may be expected by raising the temperature of the single acid pretreatment solution. From the comparison of samples 9 to 11 it can be seen that the zincate immersion treatment fails when the immersion time becomes too short (see sample 11). It has been found that at temperatures below 70° C. of the single acid solution, the combination of acid immersion and etching with a.c. current becomes more important to achieve a good bonding of a subsequently applied thin zinc layer.

TABLE 1

| Sample | Sulphuric acid | | Etching a.c. | Zincate | | Adhesion |
| | T (° C.) | t (s) | current (A/dm$^2$) | T (° C.) | t (s) | |
|---|---|---|---|---|---|---|
| 1 | n.a. | n.a. | n.a. | 20 | 20 | − |
| 2 | n.a. | n.a. | n.a. | 20 | 60 | − |
| 3 | 20 | 5 | n.a. | 20 | 60 | ± |
| 4 | 50 | 2 | n.a. | 30 | 5 | + |
| 5 | 50 | 2 | n.a. | 40 | 10 | + |
| 6 | 95 | 5 | n.a. | 20 | 20 | + |
| 7 | 20 | 5 | 5 | 20 | 60 | + |
| 8 | 20 | 2 | 10 | 20 | 60 | + |
| 9 | 95 | 2 | 5 | 20 | 20 | + |
| 10 | 95 | 2 | 10 | 20 | 60 | + |
| 11 | 95 | 5 | 10 | 20 | 2 | − |

TABLE 2

| Compound | Concentration (g/l) |
|---|---|
| Nickel sulphate | 142 |
| Ammonium sulphate | 34 |
| Nickel chloride | 30 |
| Sodium citrate | 140 |
| Sodium gluconate | 30 |
| Bismuth ions | 1 |

EXAMPLE 2

Samples 5 and 6 of Example 1 have been plated subsequently also with a Ni—Bi alloy layer and have been tested for their brazeability.

The nickel plating bath used has the composition of Table 2 and having a pH of 5.5. The Bi-ion concentration has been added to the plating bath using a Bi-ion concentrate of 160 g/l sodium hydroxide, 300 g/l sodium gluconate and 110 g/l bismuth oxide. The electroplating of a Ni—Bi layer was performed at 57° C. using a current density of 6 A/dm$^2$ and a plating time of 25 sec.

On a laboratory scale of testing the brazing tests were carried out in a small quartz furnace. Small coupons of 25 mm×25 mm were cut from the nickel-bismuth-plated sheets. A small strip of a bare AA3003 alloy measuring 30 mm×7 mm×1 mm was bent in the center to an angle of 45° and laid on the coupons. The strip-on-the-coupon samples were heated under flowing nitrogen, with heating from room temperature to 580° C., dwell time at 580° C. for 1 minute, cooling from 580° C. to room temperature. The brazing process was judged on possible formation of wrinkles, capillary depression and fillet formation. An overall assessment was given where: (−)=poor brazeability, (−/±)=fair brazeability, (±)=good brazeability, and (+)=excellent brazeability. Both samples 5 and 6 had an excellent brazeability.

EXAMPLE 3

The Ni—Bi plating according to Example 2 has been repeated on the material of Example 1, which material has been pretreated only by means of etching with a current density of 10 A/dm$^2$ and the other etching parameters as set out in Example 1, and whereby the single acid immersion and the zincate immersion treatment have not been used. It has been found that when the zincate immersion is being skipped, no nickel is being deposited on the surface but only hydrogen is being evolved during the Ni—Bi plating process.

EXAMPLE 4

One of the laboratory scale experiments of Example 1 has been repeated using a aluminium brazing sheets manufactured from an AA3003 core alloy clad on one side only with an AA4045 clad alloy, and having a total thickness of 0.5 mm and a clad layer thickness of 50 microns. The brazing sheet has been immersed in the same single acid solution as used in Example 1 for 2 sec. at 50° C., has not been etched without any current applied, and a thin zinc layer was applied at 40° C. using a treatment time of 2 sec. Hence, the thin zinc layer was applied on both an AA3xxx and on an AA4xxx-series alloys. The adhesion assessment for both sides was (+), indicating that the pre-treatment according to the invention is applicable to AA3xxx-series alloys also.

EXAMPLE 5

The experiment of Example 1 has been repeated on bare non-clad AA5182 sheet material, being a typical automotive body sheet aluminium alloy. The experimental conditions and the results for the adhesion of the thin zinc layer applied by the zincate treatment are shown in Table 3.

From these results it can be seen that when no pre-treatment is applied the adhesion of the subsequent applied thin zinc layer is poor. The adhesion is still poor when the pre-treatment at 50° C. is applied. The adhesion is only slightly improved by increasing the treatment temperature from 50° C. to 95° C., which high temperature suffers from the disadvantage of hydrogen gas evolution. The adhesion is further improved when the pre-treatment consists of the sulphuric acid immersion at 95° C. is followed by etching according to the invention. Thus AA5xxx series aluminium alloys may be used in the pretreatment or cleaning method according to the invention, but in order to obtain an improved but still not good bonding of the subsequent applied thin intermediate zinc layer, the aluminium alloy has to be worked at the upper-range of the method conditions, and demonstrating that in the method according to the invention the choice of the aluminium surface is critical.

TABLE 3

| Sample | Sulphuric acid T (°C.) | Sulphuric acid t (s) | Etching a.c. current (A/dm²) | Zincate T (°C.) | Zincate t (s) | Adhesion |
|---|---|---|---|---|---|---|
| 1 | n.a. | n.a. | n.a. | 40 | 5 | − |
| 2 | 50 | 5 | n.a. | 40 | 5 | − |
| 3 | 95 | 5 | n.a. | 40 | 5 | ± |
| 4 | 95 | 5 | 10 | 40 | 5 | ± |

EXAMPLE 6

The laboratory scale experiment of Example 1 for the samples 4 to 7 has been repeated with the modification that some copper has been dissolved in the single sulphuric acid solution. It is believed that in an industrial scale cleaning process the amount of copper will not exceed 0.1 g/l. The most likely copper source to the acid solution is presumably the gradually leaching of copper from the aluminium alloy surface being cleaned or pre-treated. Copper contamination might lead to adhesion problems, because copper can spontaneously deposit on aluminium workpiece surface. However to exaggerate the effect of a possible copper contamination of the acid solution an excessive amount of about 1 g/l Cu was intentionally added.

Surprisingly, it has been found that copper in the sulphuric acid solution does not undermine the adhesion of the subsequent applied thin zinc layer applied, although some copper is clearly deposited during the cleaning treatment. The deposition of copper on the workpiece surfaces increased with increasing temperature of the acid solution.

Having now fully described the invention, it will be apparent to one of ordinary skill in the art that many changes and modifications can be made without departing from the spirit or scope of the invention as herein described.

What is claimed is:

1. A method for applying a metal layer onto at least one surface of an aluminium or aluminium alloy workpiece, comprising the steps of:
   pretreating said surface, wherein the pretreating step comprises the sequential steps of (a) non-electrolytic treatment by immersion of the workpiece in a single acid solution having a temperature of at most 100° C. and selected from the group consisting of a sulphuric acid or phosphoric acid solution, and (b) etching the workpiece using a voltage selected from the group consisting of an a.c. voltage and a pulse-current voltage, said voltage used in an acidic electrolyte capable of dissolving aluminium oxide and maintained at a temperature in the range of 30° C. to 100° C., under conditions such that on the surface of the workpiece no further oxide film is formed; and after said pretreating
   applying the metal layer to the pretreated at least one surface by plating.

2. A method according to claim 1, wherein the voltage is an a.c. voltage.

3. A method according to claim 2, wherein the acidic electrolyte contains sulphuric acid.

4. A method according to claim 2, wherein the temperature at which the acidic electrolyte is maintained is in the range of 60 to 100° C.

5. A method according to claim 1, wherein the voltage is pulse-current voltage in.

6. A method according to claim 5, wherein the temperature at which the acidic electrolyte is maintained is in the range of 50 to 100° C.

7. A method according to claim 5, wherein the acidic electrolyte contains sulphuric acid.

8. A method according to claim 1, wherein the workpiece is an elongated aluminium alloy stock.

9. A method according to claim 1, wherein at least the outer surface of the pretreated workpiece is of an AA3xxx-, AA4xxx-, or AA6xxx-series aluminium alloy.

10. A method according to claim 9, wherein the workpiece is a brazing sheet and the at least the outer surface of the pretreated workpiece is of AA4xxx-series aluminium alloy.

11. A method according to claim 1, wherein said pretreatment step is applied prior to subsequently applying an intermediate metal layer onto the pretreated workpiece, the intermediate metal layer being selected from the group consisting of zinc, zinc alloy, tin and tin alloy.

12. A method according to claim 11, wherein the intermediate metal layer has a thickness in a range of 0.03 to 0.35 micron.

13. A method according to claim 11, wherein the intermediate metal layer has a thickness of at most 0.35 micron.

14. A method according to claim 11, wherein the intermediate metal layer has a thickness of at most 1 micron.

15. A method for applying a metal layer onto at least one surface of an aluminium or aluminium alloy workpiece according to claim 1, comprising the sequential steps of the pretreating of the surface of the workpiece, applying an intermediate metal layer onto the pretreated workpiece, the intermediate metal layer being selected from the group consisting of zinc, zinc alloy, tin and tin alloy, and the process step of the applying of the plated metal layer.

16. A method for applying a metal layer to at least one surface of an aluminium or aluminium alloy workpiece according to claim 15, wherein said surface of the aluminium or aluminium alloy workpiece is covered with said intermediate metal layer and said intermediate layer has a thickness of not more than 1 μm, and is applied between said process step (b) comprising said etching the surface of the workpiece and the process step of the applying of the plated metal layer.

17. A method according to claim 16, wherein said plated metal layer comprises a metal selected from the group consisting of Ni, Ni-Bi alloy, Ni-Sn alloy, Ni-Pb alloy, copper, and copper alloy.

18. A method according to claim 1, wherein the single acid solution is a sulphuric acid solution.

19. A method according to claim 1, wherein the workpiece is an aluminium brazing sheet and the plated metal layer of said applying step comprises nickel-bismuth alloy or nickel-lead alloy.

20. A method according to claim 1, wherein the plated metal layer has a thickness in a range of 0.03 to 2.0 micron.

21. A method according to claim 1, wherein the plated metal layer has a thickness in a range of 0.03 to 1.0 micron.

22. A method according to claim 1, wherein the plated metal layer has a thickness in a range of 0.05 to 0.5 micron.

23. A method according to claim 1, wherein steps (a) and (b) occur in the same solution tank using the single acid solution.

* * * * *

UNITED STATES PATENT AND TRADEMARK OFFICE
CERTIFICATE OF CORRECTION

PATENT NO.       : 6,846,401 B2                                    Page 1 of 1
APPLICATION NO.  : 10/125583
DATED            : January 25, 2005
INVENTOR(S)      : Jacques Hubert Olga Joseph Wijenberg et al.

It is certified that error appears in the above-identified patent and that said Letters Patent is hereby corrected as shown below:

Title Page   #30

Foreign Application Priority Data: "DE" should read --EP--

Signed and Sealed this

Fifteenth Day of August, 2006

JON W. DUDAS
*Director of the United States Patent and Trademark Office*